April 29, 1924.

F. M. SMITH

ARTIFICIAL BAIT

Filed Oct. 22, 1915

1,492,228

Patented Apr. 29, 1924.

1,492,228

UNITED STATES PATENT OFFICE.

FILLMORE M. SMITH, OF SYRACUSE, NEW YORK, ASSIGNOR, BY MESNE ASSIGNMENTS, TO JAMES HEDDON'S SONS, OF DOWAGIAC, MICHIGAN, A CORPORATION OF MICHIGAN.

ARTIFICIAL BAIT.

Application filed October 22, 1915. Serial No. 57,264.

*To all whom it may concern:*

Be it known that I, FILLMORE M. SMITH, of Syracuse, in the county of Onondaga and State of New York, have invented a certain new and useful Artificial Bait, of which the following is a specification.

My invention relates to improvements in artificial bait. One of the objects of my invention is to provide an improved bait which shall have such a motion in the water that it will be attractive to the fish, and which is of simple construction and easy to manufacture. Further objects will appear from the detailed description to follow and from the appended claims.

In the drawings in which I have shown one embodiment of my invention—

Figure 1:
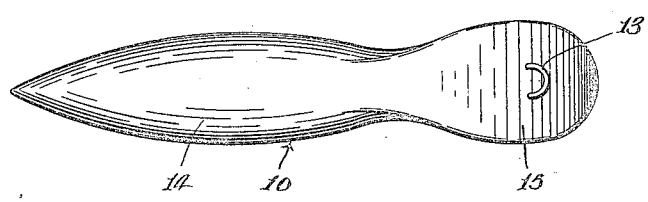
Fig. 1 is a plan view of my improved bait.
Figure 2:
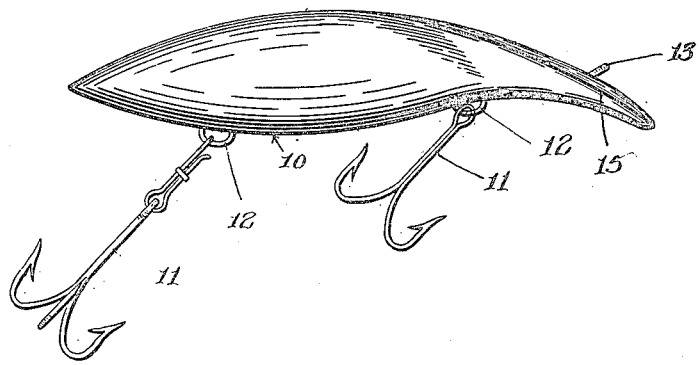
Fig. 2 is a side elevation thereof.

Referring now to the drawings in detail, the bait shown comprises a body portion 10 which may be of any suitable material which will float, such as wood, and hooks 11 secured to the body portion 10 by means of staples 12 or other suitable securing means. A staple or other securing means 13 is provided adjacent the forward end of the body portion for the attachment of a line. The body portion 10 comprises a tapering cigar shaped portion 14 substantially circular in cross section and a forward blade like nose or head portion 15, which extends downwardly and forwardly from the portion 14, and the forward portion of which extends below the axis of the portion 14. The nose or head portion 15 is ellipsoidal in plan view and its upper surface constitutes a diving face which extends laterally in both directions further than the neck portion between the cigar shaped portion and the nose portion as shown in Fig. 1. The body portion 10 merges at its forward end into the neck portion, and the head portion 15 extends forwardly from the neck portion from which it merges. The body 10 and head 15 as shown in Fig. 1 constitute in effect two bulbous portions integrally united end to end by the reduced neck which merges symmetrically into both of said bulbous portions. The upper outline of a side elevation of the portions 14 and 15 forms substantially the arc of a circle, the radius of which is about equal to the length of the bait as shown in Fig. 2, although these portions may be varied.

In using the bait a line is attached to the staple 13 and the bait is drawn through the water. The shape and proportions of the nose portion 15 causes the bait to dive and also to sway alternately and rapidly to the right and left in a narrow path in the water causing a swimming motion which is remarkably like that of a fish, and which makes it a very attractive bait.

It will be noted that the staple or securing means 13 is located a substantial distance forwardly of the center of the diving face. It has been found in practice that this location of the line-tie contributes materially to the desired diving and sinuous motion of the bait in the water.

Having thus described my invention, what I claim as new and desire to secure by Letters Patent, is—

1. An artificial bait comprising a buoyant body shaped to form an elongated cigar-shaped main portion, a blade-like forward portion, and a reduced neck portion between said main portion and said forward portion, said main portion being enlarged at its middle part and tapering therefrom toward said neck portion, and being substantially circular in cross section and substantially smooth and without projections from end to end and said forward portion extending downwardly and forwardly from said neck portion and extending laterally on both sides further than said neck portion and being thinner vertically than laterally, said blade-like forward portion tapering rearwardly toward said reduced neck portion.

2. An artificial bait comprising a buoyant body shaped to form an elongated cigar-shaped main portion, a blade-like forward portion, and a reduced neck portion between said main portion and said forward portion, said main portion being enlarged at its middle part and tapering therefrom toward said neck portion and being substantially circular in cross section and substantially smooth and without projections from end to end and said forward portion extending downwardly and forwardly from said neck portion and being thinner vertically than laterally.

3. An artificial bait comprising a buoyant body shaped to form an elongated cigar-shaped main portion, a blade-like forward portion, and a reduced neck portion between said main portion and said forward portion, said main portion being enlarged at its middle part and tapering therefrom toward said neck portion and being substantially circular in cross section and substantially smooth and without projections from end to end, said forward portion extending downwardly and forwardly from said neck portion and being thinner vertically than laterally, and means for attaching a line to said blade portion substantially in line with the axis of said main portion.

4. An artificial bait comprising a rigid buoyant body shaped to form an elongated main portion, a blade-like forward portion, and a reduced neck portion between said main portion and said forward portion, said forward portion extending downwardly and forwardly from said neck portion and being thinner vertically than laterally, and means for attaching a line to said blade portion substantially in line with the axis of said main portion.

5. A fish bait comprising a substantially ellipsoidal body and merging at its forward end into a contracted neck, a head extending forwardly from the neck from which it merges and having a forwardly downwardly-extending face adapted to lower the bait as it is drawn through the water, means for attaching a draft line to the bait, and a hook secured to the body.

6. An artificial bait formed of one integral piece of material of less specific gravity than water and shaped with an ellipsoidal body, a head at the front of the body and connected thereto by a neck contracted with respect to both the head and body and into which both the head and body merge, said head provided with a forwardly and downwardly-inclined approximately plane front face, and a hook secured to the body.

7. An artificial bait comprising a substantially ellipsoidal body, a neck and a head united to each other, the head and body both flaring laterally from the neck, and the head tapered vertically and forwardly from the neck, said head provided with a surface adapted to resist the direct forward movement of the bait through the water, a hook secured to the body, and draft-line attaching means on said bait.

8. An artificial bait comprising a buoyant main body portion, a forwardly and downwardly extending head having a diving face and a neck uniting the body and head, said diving face extending laterally on both sides farther than said neck portion.

9. A fish bait comprising an elongated body merging at its forward end into a contracted neck, a head extending forwardly from the neck from which it merges and having a forwardly downwardly extending diving face adapted to lower the bait as it is drawn through the water, means for attaching a draft line to the bait, and a hook secured to the body.

10. An artificial bait comprising a buoyant body shaped to form an elongated main portion, a blade-like forward portion, and a reduced neck portion between said main portion and said forward portion, said blade-like forward portion extending downwardly and forwardly from said neck portion and being thinner vertically than laterally, and means for attaching a line to said blade portion.

11. An artificial bait formed of one integral piece comprising two bulbous portions integrally united end to end by a reduced neck which merges symmetrically into both of said bulbous portions, hooks secured to one of said bulbous portions, the other bulbous portion being provided with a forwardly and downwardly inclined approximately plane front face which tapers towards the rear, and means for attaching a draft line to the front face of the bait.

12. An artificial bait comprising a buoyant main body portion, a forwardly and downwardly extending head having a diving face and a neck uniting the body and head, said diving face extending laterally on both sides farther than said neck portion, and means for attaching a line to said diving face a substantial distance forwardly of the center of the diving face.

In testimony whereof, I have hereunto signed my name at Syracuse, in the county of Onondaga, in the State of New York, this 15th day of October, 1915.

FILLMORE M. SMITH.